UNITED STATES PATENT OFFICE.

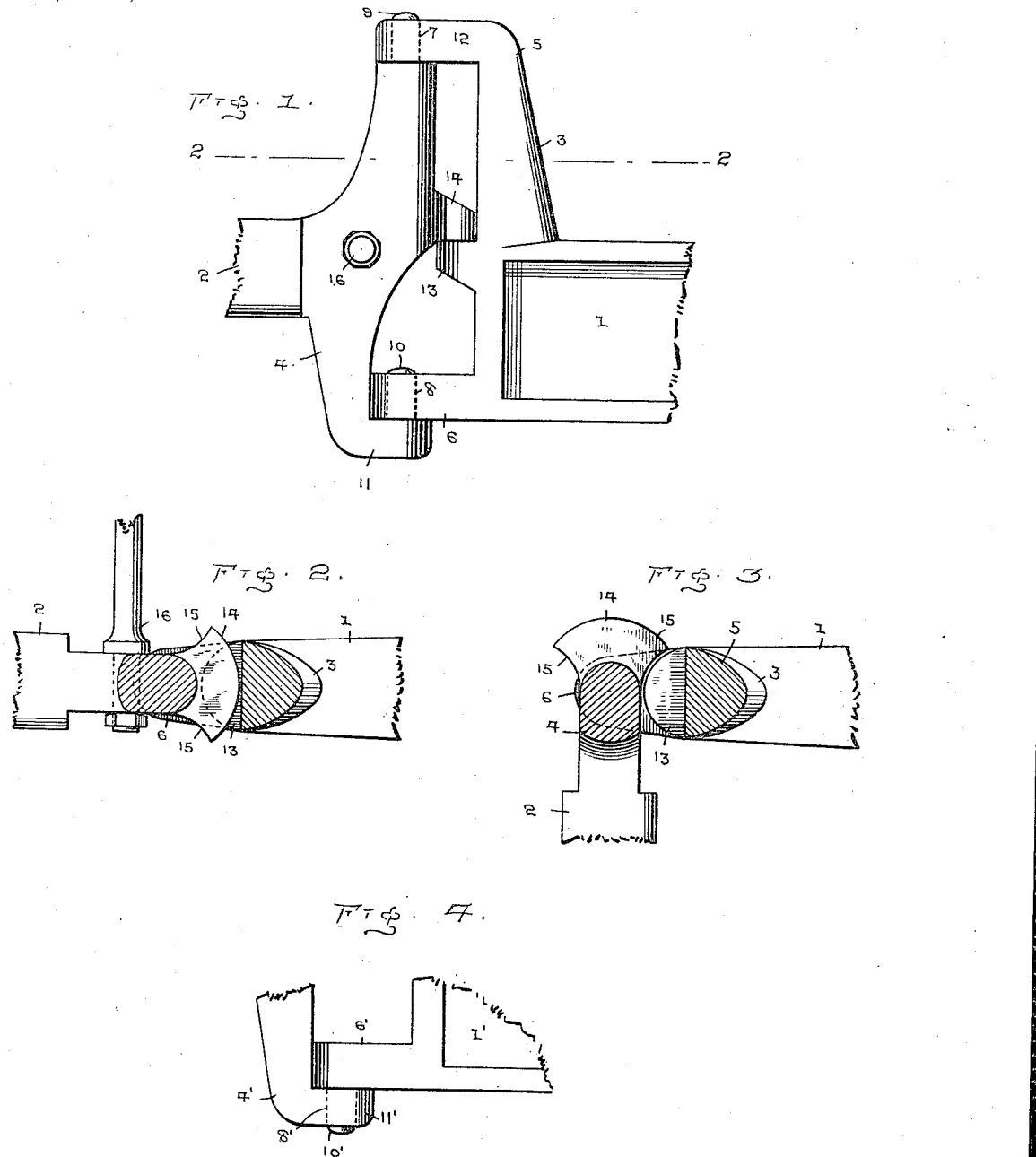

RICHARD N. HOLDING, OF INGRAM, PENNSYLVANIA.

AXLE CONSTRUCTION.

1,208,783.   Specification of Letters Patent.   Patented Dec. 19, 1916.

Application filed February 15, 1916. Serial No. 78,476.

*To all whom it may concern:*

Be it known that I, RICHARD N. HOLDING, a citizen of the United States, residing at Ingram, in the county of Allegheny and State of Pennsylvania, have invented certain new and useful Improvements in Axle Construction; and I do hereby declare the following to be a full, clear, and exact description of the invention, such as will enable others skilled in the art to which it appertains to make and use the same.

My invention relates to new and useful improvements in axle construction and more particularly to that class adapted to be used in automobiles and similar vehicles and my object is to provide a coöperating yoke and knuckle and means for pivotally attaching the knuckle to the yoke without the employment of bolts.

A further object is to provide means for holding the yoke and knuckle inseparable when in operative position.

Other objects and advantages will be hereinafter set forth and more particularly pointed out in the accompanying specification.

In the accompanying drawings which are made a part of this application, Figure 1 is an elevation of a portion of the front axle of an automobile, showing the manner of attaching the stub axle thereto. Fig. 2 is a sectional view as seen on line 2—2 Fig. 1 with the stub axle in operative position on the main axle. Fig. 3 is a similar view showing the stub axle turned to position to be engaged with or disengaged from the main axle, and Fig. 4 is a detail elevation showing a different form of yoke and knuckle.

Referring to the drawings in which similar reference characters designate corresponding parts throughout the several views, 1 indicates the main axle, such as is commonly used for the forward axle of an automobile or similar vehicle and 2 indicates the stub axle employed for carrying the forward wheels of the automobile, and in order to secure the stub axle to the main axle in such manner that the stub axle will pivot in order to guide the vehicle, the ends of the main axle are provided with yokes 3, while the inner ends of the stub axles are provided with knuckles 4. The upper and lower arms 5 and 6 of the yoke have sockets 7 and 8 therethrough to receive pivot studs 9 and 10 at the ends of the knuckle 4, the lower end of the knuckle having a lateral extension 11 upon which the stud 10 is mounted, said lateral extension passing below the arm 6 while the upper end of the knuckle 4 passes below a lateral extension 12 of the arm 5 of the yoke, and by arranging the studs and arms of the yoke in the manner shown, the knuckle may be pivotally attached to the yoke without the employment of bolts or similar devices.

In order to prevent the knuckle from casual disengagement from the yoke, the yoke is provided at a point between the ends of the upper and lower arms 5 and 6 with a flange 13 which is preferably semicircular, with which coöperates a flange 14 carried by the knuckle 4, the flange 14 passing above and resting upon the flange 13 so that under normal conditions it will be impossible to separate the knuckle from the yoke. The outer edge of the flange 14 is likewise curved in the arc of a circle and is greater in extent than the extent of the flange 13, the end edges 15 of the flange 14 being concave or curved to conform to the curve of the flange 13 so that when the stub axle is turned at right angles to the main axle in either direction the flange 14 will be free of the flange 13 so that the yoke and knuckle may be assembled together or disengaged from each other.

The stub axle 2 is swung in the arc of a circle horizontally in any preferred manner as by attaching a rod 16 to the knuckle 4, said rod being in turn attached to the usual or any preferred form of steering means (not shown) such as is commonly used in vehicles of this class.

As shown in Fig. 4 of the drawing the various parts of the knuckle and yoke may be reversed with respect to each other and arranged in numerous combinations, but in this instance the arm 6' of the main axle 1' is provided with a depending stud 10' which enters a socket 8' carried by the lateral extension 11' of the knuckle 4'. It will further be seen that this device can be applied to use in connection with any form of vehicle requiring a two part axle in order to guide the vehicle, and it will likewise be seen that when the parts are connected together, it will be practically impossible to accidentally separate the same. It will likewise be seen that by dispensing with the usual form of yoke and knuckle and the parts to secure the same together that this device can be much more cheaply manufactured than the ordinary construction of yoke and knuckle. It will likewise be seen that this form of knuckle can be readily attached to or disengaged from the yoke as it is but necessary to dispose the stub axle at right angles to the main axle in order to engage the coöperating parts of the knuckle and yoke together and after so engaged, the two parts may be securely locked together when the stub axle is swung to its normal position.

Having thus fully described my invention what I claim as new and desire to secure by Letters Patent of the United States, is:—

1. The combination with a main axle having a yoke at each end, each yoke comprising a pair of arms, the upper one of which is provided with a lateral extension, said extension and lower arm having sockets therethrough substantially in registration, of a knuckle having studs attached thereto adapted to enter said sockets of the yoke, and overlapping flanges carried by the yoke and knuckle between their ends adapted to hold said knuckle in engagement with the yoke when the knuckle is in operative position and release the knuckle from the yoke when the knuckle is turned at right angles to the trend of the axle.

2. The combination with a main axle having a yoke at its ends, of a stub axle, a knuckle carried by the stub axle, means to pivotally attach the knuckle to said yoke, a flange integral with the yoke, and a similar flange integral with the knuckle, said flanges coöperating with each other to hold the knuckle in engagement with the yoke, the flange of the knuckle having concave end edges adapted to register with the flange of the yoke when the stub shaft is turned at right angles to the main shaft whereby the knuckle may be engaged with or disengaged from the yoke.

In testimony whereof I have signed my name to this specification in the presence of two subscribing witnesses.

RICHARD N. HOLDING.

Witnesses:
CLYDE N. HARPER,
WM. W. EVANS.

Copies of this patent may be obtained for five cents each, by addressing the "Commissioner of Patents, Washington, D. C."